United States Patent [19]
Canistraro et al.

[11] Patent Number: 5,596,620
[45] Date of Patent: Jan. 21, 1997

[54] X-RAY BASED EXTENSOMETRY DEVICE FOR RADIOGRAPHY

[75] Inventors: Howard A. Canistraro, West Hartford; Eric H. Jordan, Storrs; Douglas M. Pease, South Windsor, all of Conn.

[73] Assignee: The University of Connecticut, Storrs, Conn.

[21] Appl. No.: 379,309

[22] Filed: Jan. 27, 1995

Related U.S. Application Data

[63] Continuation-in-part of Ser. No. 56,307, Apr. 30, 1993, Pat. No. 5,398,273.
[51] Int. Cl.$^6$ ..................................................... H05G 1/64
[52] U.S. Cl. .................................................. 378/84; 378/62
[58] Field of Search .............................. 378/57, 44, 62, 378/81, 84, 85, 98.9, 98.11, 98.12

[56] References Cited

U.S. PATENT DOCUMENTS

| | | | |
|---|---|---|---|
| 3,777,156 | 12/1973 | Hammond et al. | 378/84 |
| 4,577,337 | 3/1986 | Light | 378/44 |
| 4,611,341 | 9/1986 | Brody | 378/98.11 |
| 4,637,041 | 1/1987 | Brinkgreve et al. | 378/84 |
| 4,642,811 | 2/1987 | Georgopoulos | 378/84 X |
| 4,736,398 | 4/1988 | Graeff et al. | 378/98.11 X |
| 4,945,552 | 7/1990 | Ueda et al. | 378/98.11 |
| 4,969,175 | 11/1990 | Nelson et al. | 378/98.9 X |
| 5,047,650 | 9/1991 | Harada et al. | 378/84 X |
| 5,164,975 | 11/1992 | Steinmeyer | 378/84 |
| 5,220,591 | 6/1993 | Ohsugi et al. | 378/44 X |
| 5,274,435 | 12/1993 | Hettrick | 378/84 X |
| 5,319,694 | 6/1994 | Ingal et al. | 378/84 |

FOREIGN PATENT DOCUMENTS 0057145  4/1984  Japan ...................................... 378/44

OTHER PUBLICATIONS

High Temperature Displacement Measurement Using A Scanning Focused X–Ray Line Source: Jordan et al. *Advances In X–Ray Analysis*, Jun. 1991.
X–Ray Based Displacement Measurement For Hostiel Environments: Canistraro et al "Nasa Technical Memo 10551" Mar. 1992.
X–Ray Beam Method For Displacement Measurements In Hostile Environments And Strean Measurement Conference: E. H. Jordan et al, Nov. 1989.

*Primary Examiner*—David P. Porta
*Attorney, Agent, or Firm*—Fishman, Dionne & Cantor

[57] ABSTRACT

An apparatus which allows monochromatic radiographs to be produced using conventional "table top" Coolidge tube generated x-rays, comprises of the use of known bent crystal x-ray diffractive optics to produce radiographic images. The apparatus for producing the desirable x-ray radiation in a predetermined maximum intensity includes a crystal of the type mentioned above which focuses the x-rays emitted from the tube, the crystal and tube being mounted on a linear translation table. In addition, a method of mammography and differential angiography employing that device are presented. Resolution of mammographs are improved and the method which uses images obtained with radiation above and below the absorption edge of the dye being used to detect anomalies in a circulatory system allows the use of dramatically reduced dye concentrations.

21 Claims, 4 Drawing Sheets

X-RAY BASED EXTENSOMETRY DEVICE FOR RADIOGRAPHY

CROSS-REFERENCE TO RELATED APPLICATION

This is a continuation-in-part of U.S. application Ser. No. 08/056,307 filed Apr. 30, 1993 now U.S. Pat. No. 5,398,273.

BACKGROUND OF THE INVENTION

1. Field of the Invention

This invention relates generally to the field of radiography with mammography and differential angiography being particular examples. More particularly, this invention relates to a new and improved method and apparatus for conducting internal biological imaging.

2. Prior Art

One of the ubiquitous health hazards in todays world is mammarian malignancy. The disease, otherwise known as breast cancer, affects a significant number of women worldwide each year. Because of the staggering number of affected women and the deadly potential of the disease, much research has been carried out to better the chances of detection of the disease at an early stage, where the likelihood of successful treatment is substantially more promising.

Radiography for the discovery of anomalous features such as tumors in mammography, rely on the anomalous features having different x-ray absorption properties when compared to normal features. In general, the contrast produced in x-ray images between anomalous material and normal material varies with the wavelength of the x-rays used. Improved detection of anomalies can be achieved by using selective wavelengths. For example, in state of the art mammography, filters are used to block a fraction of the most radiation above about 17 thousand electron volts (17 Kev). As is axiomatic, however, all of the radiation below 17 Kev is allowed to pass into the specimen being evaluated as are some of the higher energy components. The excess radiation above and below 17 Kev is an unnecessary hazard to the specimen exposed, and from an even more practical point of view, the excess radiation degrades the image produced thereby. Therefore, alternate methods and apparati for mammographies have been sought.

Recent studies have shown that by using the very bright monochromatic radiation available from a few national selected facilities, improved detection can be achieved. However, the present availability of monochromatic radiation producing apparati, and concomitant cost thereof is far too limiting for general medical use.

Very bright monochromatic radiation is available from a few selected synchrotron facilities. This costly apparatus with its limited availability is discussed in detail in the volume 5, number 5, 1992 edition of Synchrotron Radiation News. It is obvious that a less costly and far more widely available source is desirable to reap the potential benefits of bright monochromatic radiation for improved detection of small anomalous features in radiography procedures such as mammography, for general medical use.

Another very effective killer is coronary artery disease, which if left undetected, and consequently untreated, has an overwhelming potential to cause premature death of the affected person. The accumulation of atherosclerotic lesions in the coronary arteries can result in complete occlusion of an artery and the onset of a heart attack. Currently, the only reliable procedure for determining the location and severity of narrowing of the coronary arteries is an x-ray angiogram in which these vessels are opacified by the direct injection of a contrast, or opacifying, agent. Differential Angiography is an important diagnostic procedure used to view the circulatory system. In this procedure, a dye (usually an iodine compound) is injected into the blood flow to make the blood flow visible. Unfortunately, this is a dangerous procedure since it requires that a catheter be employed for injection of the contrast agent. The catheter is inserted into a peripheral artery and then threaded up to the heart so that the catheter tip is at the entrance of a coronary artery. Since between 0.1% and 0.3% of patients die from this test, it cannot be used as a screening test or even as a test to be done regularly on a group of patients to study the progression of coronary artery disease. If the need for the arterial catheter could be eliminated, then x-ray imaging could be done with greatly reduced risk.

An arterial catheter is currently necessary to obtain enough image contrast. The image quality is seriously degraded with a venous injection of the contrast agent because the contrast agent is diluted by about 20:1 by the time it has gone through the lungs and both sides of the heart and starts to fill the coronary arteries. An additional problem with venous injection is that part of the contrast agent bolus may still be in the left ventricle at the optimum time for taking the arterial image. This residual contrast agent produces a background which makes it difficult to see the arteries that overlay the ventricle. There are over 1,300,000 heart attacks per year in the United States—half of which are fatal. Therefore, if a safer imaging procedure were available, it would be a significant medical advance.

Monochromatic radiation from synchrotron® radiation sources for angiography of the circulatory system is discussed in detail on pages 1674–1679, Rev. Sci. Instrum. 60(7), of the July 1989 issue of the publication published by the American Institute of Physics. Very summarily, a procedure employing synchrotron radiation has been developed in which two images are produced of the target biological object using radiation above and below the absorption edge of the dye selected. The procedure is effective for its intended purpose, however, is extremely expensive and is therefore unavailable to many in need of its attributes. Again, it is clear that a less costly and far more widely available source is desirable to achieve the potential benefits of bright monochromatic radiation for improved detection of atherosclerotic lesions in the coronary arteries, thus greatly reducing the risks inherent in the prior art.

SUMMARY OF THE INVENTION

The above discussed and other problems and deficiencies of the prior art are overcome or alleviated by the novel x-ray biological imaging method and apparatus of the present invention.

In accordance with the present invention, an apparatus which allows monochromatic radiographs to be produced using a linear translation table, a conventional "table top" Coolidge tube for generating x-rays, mounted thereon and a Johansson bent and ground crystal mounted on and oriented to focus the x-rays emitted from the tube, is presented.

More specifically, in a Coolidge type x-ray tube, x-rays are generated by striking a metal anode with electrons accelerated to typically 30–40 Kev. The spectral characteristics of the radiation given exhibit two strong characteristic energy peaks called K emission lines. Each anode material will have its strongest K emission line at a different energy level. In addition, there is a broader band radiant flux called brehmsstrahlung. Current technology of filtering, as it pertains to conducting radiographic imaging in medical applications, blocks 85% of radiation above the K line and allows all radiant energy thereunder to pass.

In the present invention, a Bragg reflecting Johansson bent crystal monochrometer is used to select only the K emission line, thus achieving monochromatic illumination. The present invention involves the use of a specially configured ground and bent crystal. This achieves excellent monochromatic illumination, with a high degree of collimation.

In use, x-rays having been generated and focussed, pass through a shutter and through the biological specimen, onto a film or other detector. Images are taken achieving an overall view of the biological specimen.

In a preferred embodiment, the radiography apparatus is in an enclosure for enclosing the x-ray tube and bent crystal on the linear translation table.

In accordance with another important feature of this invention, the focusing crystal material and geometry has been optimized in order to meet the demands of the present invention. A silicon single crystal oriented to reflect on the (111) plane has been bent and ground to meet the Johansson geometric requirements, with a primary radius of curvature preferably of 1 meter. This preferred embodiment maximizes intensity while providing for the narrowest focused image possible. This crystal configuration will yield countrates and focused intensities at least two orders of magnitude greater than the prior art. Due to the limits of resolution placed on the system by Poisson Fluctuation, the more intense image provided by this invention will yield much greater resolution.

The invention is adaptable for any type of radiological imaging by varying intensity of x-ray emission, altering the crystal employed, or most importantly altering the wavelength utilized. By altering one or more of these parameters the invention can be easily modified to detect brain tumors, etc. However, for purposes of illustration but not limitation the ensuing discussion is limited to mammography and differential angiography.

In the case of mammography, the device is positioned to provide access to a breast to be examined. The selected wavelength is passed through the breast and onto a film or electronic recording device such as a CCD camera. In order to expose larger areas a series of exposures are taken in a mosaic pattern. The mosaic pattern is dictated by the smallest possible missed regions. Providing the missed regions are smaller than the smallest detectable tumor, no detectable tumor will be missed. Four procedures are preferred for avoiding missed regions. This is an important benefit of the invention and will be discussed in detail in the description of the preferred embodiments.

With respect to differential angiography the present invention alleviates the need to catheterize a patient to administer opacifying dye at the entrance of a coronary artery. The method and apparatus of the invention allow the injection of dye intravenously, which is far safer for the patient. The method and apparatus of the invention facilitates such a procedure since they can effectively image anomalies even with the dye to blood ratio significantly lower than that required for conventional devices directed toward differential angiography.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Radiography for the discovery of anomalous features such as tumors in mammography or blockages or atherosclerotic lesions in coronary arteries associated with coronary artery disease relies on the tumorous or anomalous feature having different x-ray absorption properties than normal bodily features. In general, the contrast between anomalous material and normal material varies with the wavelength of the x-rays used. Improved detection of anomalies can be achieved by using selective wavelengths. For example, in state of the art mammography, filters are used in an attempt to block all radiation above about 17 thousand electron volts (17 Kev.). This improves images taken, however, leaves all radiation under 17 Kev to degrade the images. Alternatively, recent studies have shown that by using the very bright monochromatic radiation available from a few selected synchrotron facilities, improved detection can be achieved. Unfortunately, however, the availability of synchrotron radiation is far too limited for general medical use.

In one preferred embodiment of the invention, an apparatus is constructed which will inexpensively yet effectively produce the most desirable monochromatic radiation for radiographic imaging for particular suspected anomalies. Stated generally, (referring to FIG. 3) the device of the invention employs a linear translation table 108 having a Coolidge-type or other x-ray producing tube 90 mounted thereon. Also, mounted upon table 108 in a predetermined advantageous position to focus and intensify specific wavelengths emitted from tube 90 is crystal 94. A shield 106 and shutter 96 are also positioned upon table 108 between the tube 90 and crystal 94 and the biological specimen 98 to protect the same from premature exposure. Shutter 96 is subsequently opened in a predetermined amount to allow a preselected amount of radiation to expose the specimen 98. Individual components of the device are discussed in further detail hereunder.

Figure 1:
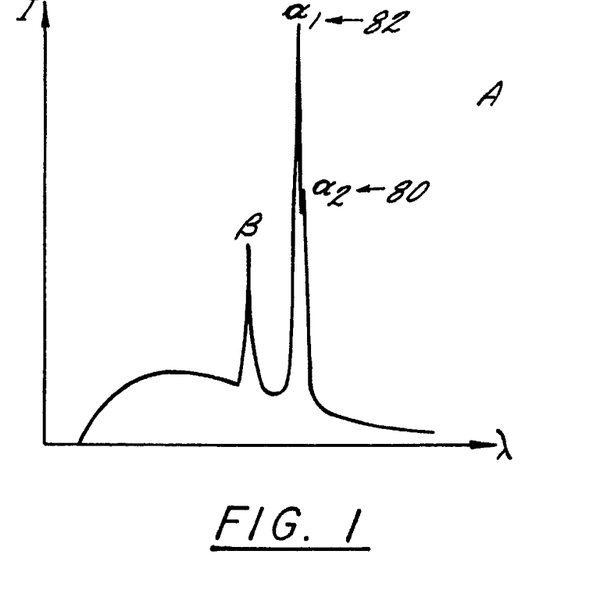
FIG. 1 is a graph depicting the characteristic spectral output from a Coolidge type x-ray tube showing the two characteristic energy peaks that are termed the "K Lines"
Figure 2:
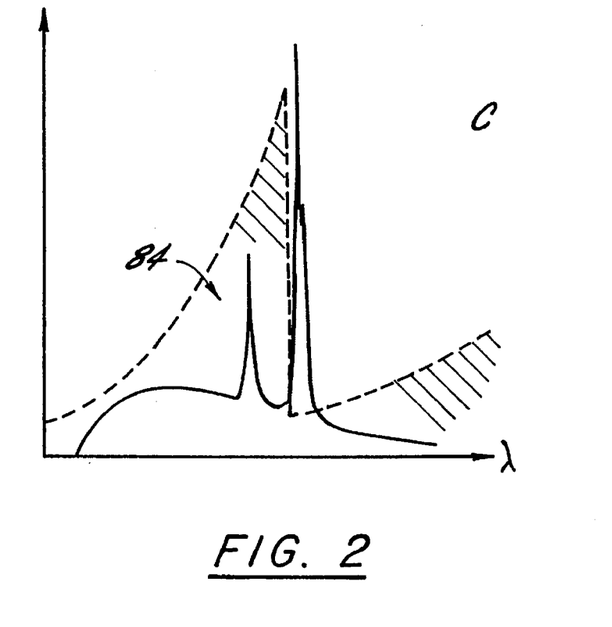
FIG. 2 is a graph depicting the spectral output from conventional filtering techniques, where nearly all energy above a certain value is blocked, but that below the selected K-Line is allowed to pass to the specimen.

In a Coolidge type x-ray tube, which is preferred in the present invention because of availability and economy, x-rays are generated by striking a metal anode with electrons accelerated to typically 30–40 Kev. The spectral characterizations of the radiation produced are illustrated in FIG. 1 where two strong characteristic energy peaks 80, 82 are observed. Characteristic peaks are known to those of skill in the art to be associated with the anode material employed, and are termed K emission lines. Each anode material will have its strongest K emission line at a different energy level. Thus, it is possible to tailor the energy peak to the desired procedure. In addition, there is a broader band radiant flux called bremsstrahlung which is generally filtered before exposure of the specimen. In prior art devices, most of the radiation above the desirable K line is filtered, leaving, however, the unpreferred lower wavelengths and some of the higher energy radiation which detrimentally affect the image produced. FIG. 2 illustrates the blocked radiation by the single cross hatched area 84. Preferably, a 2.5 kwatt x-ray tube is employed in the device of the invention.

The device itself provides that the x-ray tube 90 is mounted on a linear translation table 108 which includes sliding table support 34 for supporting the x-ray tube 90, the bent crystal 94 and a sliding table actuator. The linear translation table 108 is commercially available and may comprise, for example, a computer controlled translation stage manufactured, for example, by New England Affiliated Technologies of Lawrence, Mass. which particularly has a vertical support capacity of 400 lbs. Preferably, the translation table 108 is height adjustable so that the device may be positioned optimally to expose a breast. The crystal employed is, of course, very important to the successful operation of the device.

Figure 3:
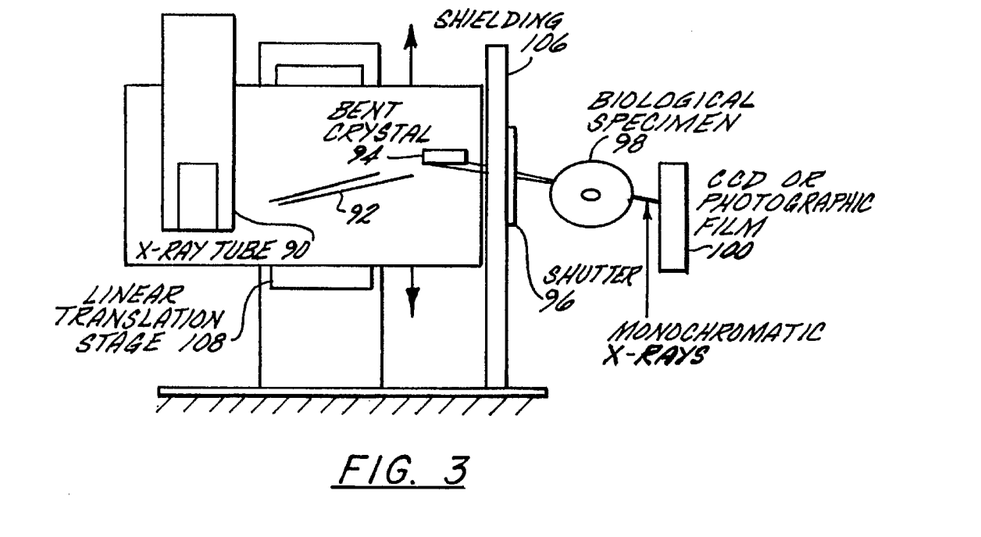
FIG. 3 is a schematic elevation overall view of an x-ray based biological imaging device configured to conduct breast mammography exams in accordance with the present invention.

The crystal, 94 in FIG. 3, employed in the preferred embodiment is a specifically designed symmetric cut, ground and bent crystal. the crystal is a monochrometer dictated by Braggs law, and facilitates greater collection of x-rays and improved collimation and discrimination of the x-ray image.

As above noted, specific x-ray tubes are selected for desired energy peaks. Energy peaks are, of course, specific wavelengths. Once it has been determined which wavelength will best be absorbed by the specific suspected tumor type, the crystal parameters and incident angle can be calculated by Braggs law:

$n\lambda = 2d \sin \Theta$ where $\Theta$=incident angle d=spacing of the plane of atoms in the crystal that is reflective $\lambda$=wavelength n=a positive integar The variables are selected or known as follows:

$\Theta$=6.48 degrees d=3.1355 angstroms $\lambda$=0.707 angstroms

The crystal having been determined by the parameters set forth provides a single wavelength defined as the energy peak K-line of the x-ray tube. This optimizes the radiation to be utilized for maximum intensity and not maximum energy resolution. The image provided on the film or electronic detection device, into which the monochromatic energy passes after exiting the biological sample, is greatly enhanced.

Referring now to FIG. 3 which is a schematic elevation view of an x-ray based biological imaging device configured to conduct breast mammography exams, in accordance with the present invention. The device is generally illustrated at 104. X-rays from a Coolidge type x-ray tube 90 are generated. A fraction of the x-rays 92 generated by the x-ray tube 90 are monochromatized and focussed using a Johansson ground and bent crystal 94 that achieves the desired focussing. In order to limit overall exposure to the radiation the x-rays 92 pass through a shutter 96 and then through the biological specimen 98 before traveling to a film or electronic detection device 100.

Figure 4:
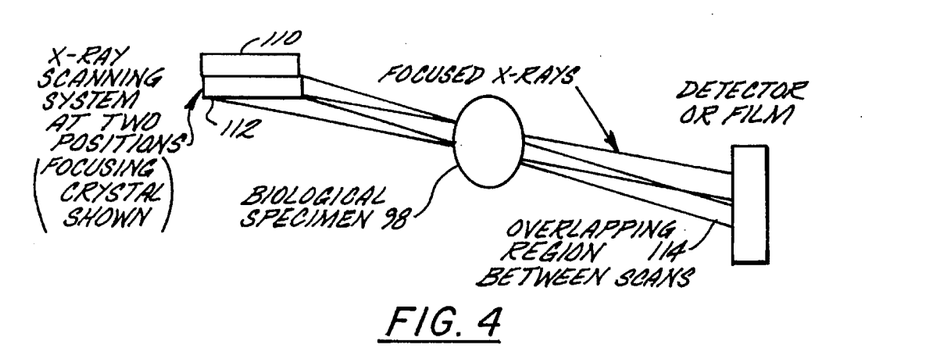
FIG. 4 is a schematic elevation view of the device of FIG. 3 depicted in the non-duplication scan mode, where exposures are taken at different focussed x-ray image positions.

FIG. 4 is a partial schematic elevation view of the device of FIG. 3 depicted in the non-duplicating scan mode, where exposures can be taken at different focussed x-ray image positions. In FIG. 4, the illustration shows the focussing bent crystal at two positions 110 and 112 whereas the balance of the device has been omitted.

As stated, the x-ray tube 90, Bent crystal 94, shielding 106 and shutter 96 are all mounted on a linear translation stage 108 to allow for proper positioning so that x-rays emitted from the assembly pass through the specimen or object of interest 98 and then onto film or into an electronic recording device, such as a CCD camera 100. The exposed film may then be developed or subsequently electronically scanned.

Most preferably, images are taken on a single exposure basis rather than scanning. This is because scanning, although possible, and even utilized in some rare cases, degrades the shadow images produced by the method and apparatus of the invention. This, as will be appreciated by those of skill in the art, is because of the divergence angle ($\pi$) of the beam and the thickness of the sample. Where the exposure area of the object to be imaged is larger than can be effectively imaged in a single exposure, the preferred method is to create a mosaic pattern of the object, employing a series of single exposures. This provides significantly better images without loss.

When the particular condition to be inspected requires a scanning procedure, four preferred approaches are indicated. These approaches both minimize the drawback above set forth and additionally reduce the area of unexamined tissue which is inherent in prior art scans. To avoid unexamined areas 114, the divergence angle can be reduced for a particular sample thickness. The desired procedure is to make any regions missing significantly smaller than the smallest detectable tumor. No detectable tumors could then be missed.

It is a second preferred procedure to provide sufficient overlap of the scanning beams to ensure that no regions are left unexposed. This procedure is desirable since no regions are left unexposed, however, where regions are double exposed the quality of the image is degraded. This drawback can be alleviated in two preferred methods.

In the first preferred method the region of overlapping exposure is so small that it cannot obliterate an anomaly of even the smallest detectable size. Alternatively, the second preferred method employs an electronic processor to remove one of the images generated in the over-lap area. This is accomplished through electronic manipulation of the images (or subtraction of one image from the other) which is known to the relevant art. The final preferred procedure where scanning is necessary dictates that two images are exposed where the missing regions are located in different places, i.e., the missing regions are non-intersecting sets.

The mosaic mode of exposure offers an opportunity to have variable exposure for different regions of a radiograph. It is usually the case that the amount of exposure that is ideal for imaging thick dense regions of a specimen or object necessarily results in over exposure of other features and regions. To overcome this problem, the exposure for each piece of the radiographic mosaic image may be set individually. The exposure may be controlled by either measuring the thickness profile of the specimen and calculating the optimum exposure based on this thickness profile and estimated absorption properties or by sensing the total exposure in situ and automatically end the exposure according to the desired level of exposure.

Figure 6A:
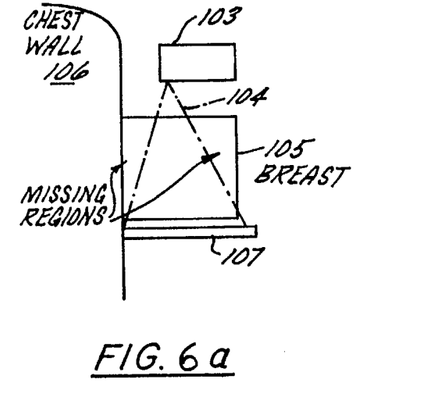
FIG. 6a is a schematic view of a prior art device illustrating missed region near chest wall to be viewed with FIG. 6b.
Figure 6B:
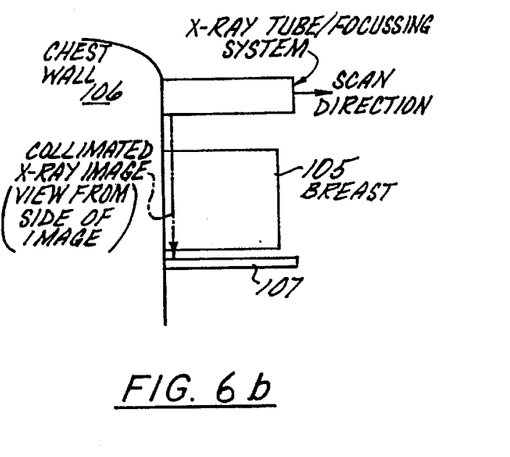
FIG. 6b is a schematic view of the imaging device illustrating how the device alleviates near-chest-wall missed regions.

Another benefit derived from the present invention is to avoid near-chest-wall problems. Radiographs are currently taken using small point like sources. As point sources 103 the radiation 104 is divergent as in FIG. 6a. The result of divergent sources is that some portion of the breast 105 near the chest wall 106 is not imaged because rays having the angle needed to pass through the shaded area in the FIG. 6a will not reach the film 107 and instead are absorbed in the chest 106. In typical practice this region is not irradiated because no image is formed. The size of this region is directly related to the beam divergence angle T which will be reduced in the current invention. As illustrated in FIG. 6b, there is little or no divergence thus providing a much smaller missed region.

In an alternate embodiment of the invention, the device described above is employed in tandem with a similar device to improve the resolution, reliability and safety of differential angiography.

As has been discussed in the background section hereof, prior art differential angiography required that a catheter be threaded from a peripheral artery to the opening of a coronary artery to release an opacifying agent in an effective location. It is known that to release opacifying agent intravenously has generally been wholly ineffective because the agent is diluted to about 20:1 by the time it has been carried by the patient's blood, through the lungs and both sides of the heart to begin to infiltrate the coronary arteries. Residues of the opacifying agent in the left ventricle also degrade images taken in this manner.

Heretofore, the only method by which a differential angiogram could be undertaken without the use of a catheter was by employing the extremely expensive and limited in availability synchrotron machine. These circumstances effectively preclude from many; the safer procedure.

In order to provide more ubiquitous catheterless angiography, the present inventors have employed a modified extensometry device, that device being disclosed in parent U.S. Ser. No. 08/056,307, of which this application is a continuation-in-part, to utilize two K-lines, one above and one below the absorption edge of the opacifying agent previously intravenously injected into the patient. The cost effectiveness of the extensometry based device will allow more widespread use of the lower risk procedure of intravenous injection. Two preferred embodiments of the apparatus are discussed.

In the first preferred embodiment of the differential angiography device, two x-ray sources, two focussing crystals and two light reception arrangements are positioned so as to cross collimated x-ray radiation through the specimen. One of the x-ray arrangements is configured to produce radiation above the absorption edge of the opacifying dye utilized; the other x-ray arrangement produces radiation just below the absorption edge of the dye. In the second preferred embodiment, discussed hereunder, two embodiments of a single source arrangement are disclosed.

Figure 5A:
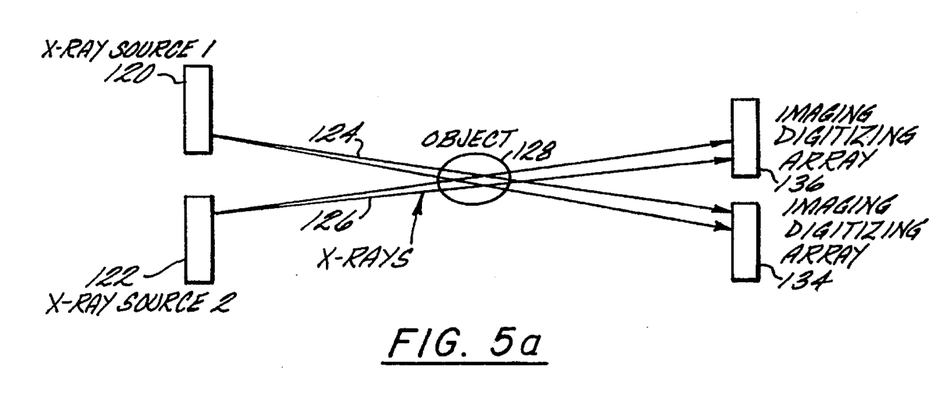
FIG. 5a is a schematic view of an x-ray based biological imaging device configured to conduct differential angiography in accordance with the present invention.

Referring now to FIG. 5a, two complete, separate x-ray units are illustrated at 120 and 122. The x-ray generators for each unit 120 and 122 will be designed to emit characteristic radiation above and below the absorption edge of the opacifying agent by choosing a suitable anode material. The two generators will also be of suitable power such as can be achieved using rotating anode generators or by flash x-ray generators as described in E. Burattini and Simonetti, G., Synchrotron Radiation News, Vol. 5, No. 5, 1992, pp. 11–14 and Thompson, A. C., Rubenstein, E., Zerman, H. D., Hofstadter, R., Otis, J. N., Giacomini, J. C, Gordon, H. J., Brown, G. S., Tomlinson, W. and Kernoff, R. S., Rev. Sci. Instr., Vol 60, #7, 1989 pp. 1679–1764, which are incorporated herein by reference. X-ray unit 120 is employed to illuminate below the absorption edge of the dye being used and x-ray unit 122 is utilized to illuminate above the absorption edge of the dye being used. X-ray beam 124 passes through the object or specimen 128 and into imaging digitizing array 134 which records the image below the absorption edge of the dye. Similarly, x-ray unit 122 is used to illuminate above the absorption edge of the dye by projecting x-ray beam 126 through object or specimen 128 and into imaging digitizing array 136 which records the image above the absorptive edge of the opacifying agent. The two images are electronically captured and then subtracted. The image produced yields a highly resolute radiograph of the circulatory system. The system allows evaluation of a large number of bodily areas due to the reduced dye concentration required and increases safety to patients. Moreover, potential screenability is substantially improved.

Figure 5B:
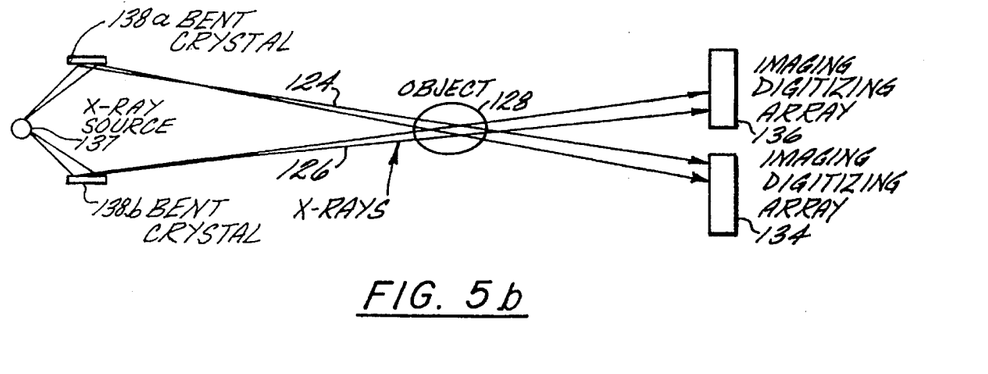
FIG. 5b is an alternate embodiment of the angiography device of the invention.

In the second preferred embodiment of the invention, referring to FIG. 5b, a single x-ray source is employed with two crystals 138a and 138b which are oriented to selectively pass and focus (1) a preselected wavelength that will be above the absorption edge of the dye and (2) a preselected wavelength that will be below the absorption edge of the dye injected, respectively. This arrangement requires a relatively high power x-ray source having suitable spectral characteristics.

Spectral characteristics considered suitable for applications of the type discussed herein are than that will produce x-ray radiation in the range of about 32.169 Kev to about 34.169 Kev. The range preferred is based upon the absorption edge of iodine at 33.169 Kev and the degradation of the image at more than 1000 ev above or below that edge. A more preferred range is within 500 ev of the absorption edge. It should be noted that where other opacifying agents are used the edge will be different; the range of 1000 ev above or below the edge will be the same. An example of a source having such characteristics is found in U.S. Pat. No. 4,887,604, the entire disclosure of which is incorporated herein by reference.

Alternatively, a flash source of appropriate spectral characteristics can be employed in the single source embodiment. A flash source having the spectral characteristics identified above, is constructible in one of two preferred ways. First, the flash source can be constructed of a binary alloy anode with one constituent having a characteristic emission line above the absorption edge of the dye and one constituent have a characteristic emission line below the absorption edge of the dye. Thereby, a single flash of the source creates both emission lines. The second preferred construction of a single flash source is of a material inherently having a $K_{\alpha 1}$ (K-alpha 1) line above the absorption edge of the dye, and a $K_{\alpha 2}$ line below the absorption edge of the opacifying agent or dye. One line above and one line below are desirable criteria because in this fashion differential angiography can be accomplished. The preferred specific anode material for an iodine dye is lanthanum.

It will be appreciated that although the x-ray device has been described particularly with reference to mammography and differential angiography, the radiography device of the invention is suited to many other types of radiographic imaging procedures. The favorable results discussed above will be observed in other imaging situations as well. The invention merely must be tailored by means of selecting an x-ray tube which produces an energy peak at a predetermined level. The predetermined energy peak level would be selected as one that the tumor or other anomalous target would absorb well.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A radiographic imaging device comprising:
   a) an x-ray source and a natural diffractive constructive x-ray interference arrangement for focusing x-rays emitted from said x-ray source into an intense monochromatic image, said x-ray source and said natural diffractive constructive x-ray interference arrangement being mounted upon a common base which provides a fixed distance and orientation from source-to-interference arrangement;
   b) a detector for detecting x-ray monochromatic radiation from said x-ray source and said natural diffractive constructive x-ray interference arrangement subsequent to said radiation passing through a specimen.

2. The apparatus of claim 1 wherein said x-ray source comprises at least one stationary anode x-ray tube and said natural diffractive constructive x-ray interference arrangement comprises at least one bent crystal in operable communication with said x-ray tube.

3. The apparatus of claim 1 wherein said common base comprises:
   a linear translation table, said x-ray source and natural diffractive constructive x-ray interference arrangement being supporting on said linear translation table.

4. The apparatus of claim 3 including:
   an enclosure for enclosing said x-ray source and natural diffractive constructive x-ray interference arrangement on said linear translation table.

5. The apparatus of claim 4 wherein:
   said enclosure includes a shutter.

6. The apparatus of claim 2 wherein said at least one bent crystal comprises:
   a plurality of spaced bent crystals.

7. The apparatus of claim 2 wherein each said at least one bent crystal further comprises a Bragg diffracting Johansson ground and bent crystal.

8. The apparatus of claim 7 wherein said at least one bent crystal has a plane of diffraction of (111).

9. The apparatus of claim 7 wherein said at least one bent crystal comprises silicon.

10. The apparatus of claim 9 wherein said at least one bent crystal has a primary radius of curvature of one meter and a secondary radius of curvature of two meters.

11. A method for producing radiographic images comprising the steps of:
    a) positioning the radiographic imaging device advantageously with respect to a specimen; comprising:
       i) an x-ray source and a natural diffractive constructive x-ray interference arrangement for focusing x-rays emitted from said x-ray source into an intense monochromatic image, said x-ray source and said natural diffractive constructive x-ray interference arrangement being mounted upon a common base which provides a fixed distance and orientation from source-to-interference arrangement;
       ii) a detector for detecting x-ray monochromatic radiation from said x-ray source and said natural diffractive constructive x-ray interference arrangement subsequent to said radiation passing through a specimen;
    b) generating x-ray radiation with a non-rotating anode source and modifying and intensifying said radiation by passing said radiation through a symmetric ground and bent crystal;
    c) directing said focused radiation at said specimen;
    d) detecting radiation passing through said specimen;
    e) creating a display of an image generated by said focused radiation passing through said specimen.

12. A process for producing a radiological image including the steps of:
    a) positioning a specimen for exposure;
    b) exposing the specimen to a predetermined x-ray wavelength only, generated by a non-rotating anode source, by passing x-ray radiation through a diffractive constructive x-ray interference arrangement; and
    c) detecting said x-ray radiation subsequently to said radiation passing through said specimen to produce an image.

13. A process for producing a radiological image as claimed in claim 12 wherein said step of exposing includes generating x-ray radiation and focusing the same by passing said radiation through a Bragg natural diffracting Johansson ground and reflecting bent crystal.

14. A process for producing a radiological image as claimed in claim 12 wherein said predetermined wavelength corresponds to an energy peak of a source of the x-ray radiation.

15. A process for producing a differential angiographic image comprising:
    a) intravenously injecting a patient with a predetermined quantity of an opacifying agent;
    b) positioning said patient between a radiation emanation point and a radiation detecting point;
    c) generating x-ray radiation from at least one non-rotating anode source and modifying said radiation by passing said radiation through a natural diffractive constructive x-ray interference arrangement said source and said arrangement being maintained at a predetermined fixed distance and orientation from one another;
    d) directing said radiation through a portion of said patient to be imaged;
    e) detecting said radiation subsequently to passing said radiation through said patient;
    f) producing an angiographic image from said detected radiation.

16. A process for producing a differential angiographic image as claimed in claim 15 wherein said source is two sources and said process is effected by employing two crystals, one for each source, and employing two detecting devices, a first for detecting x-ray radiation from one of said sources, which radiation is above an absorption edge of said opacifying agent and the second detecting device for detecting radiation from the other of said sources which produce radiation below the absorption edge of the opacifying agent, said first and second detecting devices each storing information sufficient to form an image and subtracting a first and second image one from the other to create a final image.

17. A process for producing a differential angiographic image as claimed in claim 15 wherein said source is a single anode producing a first and second $K_\alpha$ emission lines said first and second $K_\alpha$ emission lines being above and below the absorption edge of a preselected opacifying agent.

18. A process for producing a differential angiographic image as claimed in claim 17 wherein said opacifying agent is iodine.

19. A process for producing a differential angiographic image as claimed in claim 18 wherein said source is lanthanum.

20. A process for producing a differential angiographic image as claimed in claim 15 wherein said source is a single source and said step of modifying said x-ray radiation by passing said x-ray radiation through a natural diffractive constructive x-ray interference arrangement includes first and second bent crystals said crystals selectively, respectively passing an emission line above an absorption edge of said opacifying agent and an emission line below an absorption edge of said opacifying agent.

21. A process for producing a differential angiographic image as claimed in claim 15 wherein said directing step includes scanning said patient.

* * * * *